(12) United States Patent
Lewinski et al.

(10) Patent No.: US 6,555,261 B1
(45) Date of Patent: Apr. 29, 2003

(54) MICROSTRUCTURED FLOW FIELDS

(75) Inventors: Krzysztof A. Lewinski, Oakdale, MN (US); Raymond Patrick Johnston, Lake Elmo, MN (US); Thomas Herdtle, Inver Grove Heights, MN (US); David Adrian Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/430,568

(22) Filed: Oct. 29, 1999

Related U.S. Application Data
(60) Provisional application No. 60/106,124, filed on Oct. 29, 1998.

(51) Int. Cl.[7] ................................................ H01M 2/00
(52) U.S. Cl. ............................ 429/34; 429/12; 429/13; 429/38; 429/39
(58) Field of Search ............................ 429/12, 13, 38, 429/39, 34

(56) References Cited

U.S. PATENT DOCUMENTS

| | | |
|---|---|---|
| 3,814,631 A | 6/1974 | Warszawski et al. |
| 4,812,352 A | 3/1989 | Debe |
| 4,855,193 A | 8/1989 | McElroy |
| 4,876,115 A | 10/1989 | Raistrick |
| 5,039,561 A | 8/1991 | Debe |
| 5,108,849 A | 4/1992 | Watkins et al. |
| 5,211,984 A | 5/1993 | Wilson |
| 5,234,777 A | 8/1993 | Wilson |
| 5,252,410 A | 10/1993 | Wilkinson et al. |
| 5,272,017 A | 12/1993 | Swathirajan et al. |
| 5,316,871 A | 5/1994 | Swathirajan et al. |
| 5,618,392 A | 4/1997 | Furuya |
| 5,620,807 A | 4/1997 | Mussell et al. |
| 5,641,586 A | 6/1997 | Wilson |
| 5,683,828 A | 11/1997 | Spear et al. |
| 5,686,199 A | 11/1997 | Cavalca et al. |
| 5,728,446 A * | 3/1998 | Johnston et al. ............ 428/167 |

(List continued on next page.)

FOREIGN PATENT DOCUMENTS

| | | |
|---|---|---|
| JP | 62 086670 | 4/1987 |
| JP | 09 055215 A | 2/1997 |
| JP | 11 297343 A | 10/1999 |
| WO | WO 98/52242 A | 11/1987 |
| WO | WO 94/11912 | 5/1994 |
| WO | WO 00/41260 | 7/2000 |

OTHER PUBLICATIONS

Proceedings of the Symposium on Electrode Materials and Processes for Energy Conversion and Storage; Editors: S. Srinivasan, D.D. Macdonald, and A.C. Khandkar; Energy Technology, Battery, Physical Electrochemistry, and High Temperature Materials Divisions; Proceedings vol. 94–23; The Electrochemical Society, Inc., Pennington, N.J.

Uchida et al., "New Preparation Method for Polymer–Electrolyte Fuel Cells," *J. Electrochem. Soc.*, vol. 142, No. 2, Feb. 1995, pp. 463–468.

Yi, J. S., Nguyen, T. V., Proc. $1^{st}$ Internat. Symp. PEM Fuel Cells, Eds. S. Gottesfeld, G. Halpert and A. Landgrebe, pp. 66–75, 1995.

Zawodzinski, C., Wilson, M. S., Gottesfeld, S., Proc, $1^{st}$ Internatl. Symp. PEM Fuel Cells. Eds. S. Gottesfeld, G. Halpert and A. Landgrebe, pp. 57–65, 1995.

*Primary Examiner*—Carol Chaney
*Assistant Examiner*—Dah-Wei Yuan
(74) *Attorney, Agent, or Firm*—Philip Y. Dahl

(57) ABSTRACT

A flow field for an electrochemical cell such as a fuel cell is provided, having micro-flow channels having a width or depth of less than 800 μm, a pitch of less than 800 μm, or a proportion of inter-channel land area of less than 25%. The channels may further comprise micro-features within the channels. A flow field plate comprising the subject flow field is provided.

10 Claims, 5 Drawing Sheets

U.S. PATENT DOCUMENTS

| | | |
|---|---|---|
| 5,773,160 A | 6/1998 | Wilkinson et al. |
| 5,789,093 A | 8/1998 | Malhi |
| 5,798,187 A | 8/1998 | Wilson et al. |
| 5,798,188 A | 8/1998 | Mukohyama et al. |
| 5,804,326 A | 9/1998 | Chow et al. |
| 5,840,438 A | 11/1998 | Johnson et al. |
| 5,858,567 A | 1/1999 | Spear, Jr. et al. |
| 5,858,569 A | 1/1999 | Meacher et al. |
| 5,863,671 A | 1/1999 | Spear, Jr. et al. |
| 5,885,728 A | 3/1999 | Mercuri et al. |
| 5,922,485 A | 7/1999 | Enami |
| 5,935,725 A | 8/1999 | Dhar et al. |
| 5,945,232 A | 8/1999 | Ernst et al. |
| 6,007,933 A * | 12/1999 | Jones .................... 429/38 |
| 6,071,635 A * | 6/2000 | Carlstrom, Jr. .............. 429/34 |
| 6,162,507 A * | 12/2000 | Hayes et al. ............... 427/425 |
| 6,329,094 B1 * | 12/2001 | Yasuo et al. ................. 429/12 |

* cited by examiner

MICROSTRUCTURED FLOW FIELDS

CROSS-REFERENCE TO RELATED APPLICATION

This application claims priority of U.S. Provisional Patent Application No. 60/106,124 filed on Oct. 29, 1998.

FIELD OF THE INVENTION

This invention relates to flow fields for membrane electrode assemblies in electrochemical cells such as fuel cells. The flow fields of the present invention comprise a multitude of micro-flow channels preferably separated by similarly sized land features, where the channels preferably bear microstructured features. In fuel cells, the flow fields of the present invention provide enhanced distribution of fuel, improved water management, and improved electrical and thermal diffusion.

BACKGROUND OF THE INVENTION

U.S. Pat. No. 5,108,849 concerns a 7-channel serpentine flow field design wherein 7 serpentine channels run in parallel. The serpentine design makes the channels 5–15 times longer than the actual dimension of the active part of the flow field plate. However, this increases the pressure drop across the plate. Known serpentine flow fields are also prone to reactant depletion along the channels, blanketing (which occurs when a stagnant layer of depleted gas acts as a diffusional barrier) due to the length of the channels and relatively low reactant residence times, and tenting (which occurs when the DCC material expands into the flow field plate channel). In a recent theoretical study, Yi and Nguyen (J. S. Yi, T. V. Nguyen. Proc. 1st Internat. Symp. PEM Fuel Cells. Eds. S. Gottesfeld, G. Halpert and A. Landgrebe, pp. 66–75, 1995) have also shown that for classical serpentine flow fields difficulties with diffusion of reactants under the land areas can have a significant negative effect on maximum achievable current densities from a given fuel cell.

McElroy (U.S. Pat. No. 4,855,193), Wilson (U.S. Pat. No. 5798187), and Zawodzinski et al. (C. Zawodzinski, M. S. Wilson, S. Gottesfeld. Proc. 1st Internat. Symp. PEM Fuel Cells. Eds. S. Gottesfeld, G. Halpert and A. Landgrebe, pp. 57–65, 1995) have evaluated the addition of a square weave metal screen type of flow distributor to the conventional serpentine flow design. These flow fields may comprise wire fabrics or screens wherein the wires form a series of coils, weaves, crimps or other undulating contours. This approach has several shortcomings, including non-uniform reactant distribution, water management problems, and corrosion.

Similarly, U.S. Pat. No. 5,641,586 concerns a bilayer structure wherein a porous layer overlays a layer having interdigitated flow channels.

SUMMARY OF THE INVENTION

The present invention provides an improved flow field for an electrochemical cell comprising one or more micro-flow channels having a depth or width (or preferably both) of less than 800 $\mu$m, preferably less than 650 $\mu$m, more preferably less than 250 $\mu$m, and most preferably between 125 and 250 $\mu$m. These micro-flow channels preferably have a pitch of less than 800 $\mu$m, preferably less than 650 $\mu$m, more preferably less than 250 $\mu$m, and most preferably between 125 and 250 $\mu$m. Optionally, the micro-flow channels of the invention further comprise micro-features within the channels whose dimensions in depth and width are less than 80% of the depth and width of the channel, preferably less than 50%, and more preferably less than 20%. Preferably the microfeatures have dimensions of less than 160 $\mu$m and more preferably less than 100 $\mu$m. Microfeatured flow fields may have channels of up to 3 mm in depth or width and still retain advantages of the present invention. In a preferred embodiment, these micro-flow channels comprise a highly parallel pattern which may contain interconnections or branch points.

In another aspect, the invention provides flow field plates comprising micro-channel flow fields according to the present invention.

In another aspect, the invention provides diffusion current collectors (DCC's) comprising micro-channel flow fields according to the present invention.

In another aspect, the invention provides fuel cells comprising micro-channel flow field plates according to the present invention or DCC's comprising micro-channel flow fields according to the present invention.

Flow fields of the present invention can achieve more uniform reactant distribution, more uniform pressure distribution, and improved water management in a fuel cell stack via the use of highly parallel micro-flow channels with additional smaller features for enhanced performance. In addition, the flow fields of the present invention allow for a decrease in thickness of the flow field plate and/or DCC, allowing a reduction in stack weight, volume, cost, and internal electrical resistance.

As used herein,

"diffusion-current collector" or "DCC" means a layer in an electrochemical cell adjacent to the active catalytic sites which allows transport of reactant and product mass and electric current to and from the active sites, which is preferably a porous electrically conductive material;

"highly parallel" means comprising many elements having the same function, in particular, having many channels connecting the same inlet to the same outlet;

"unbranched aspect ratio" is the ratio of the length of an unbranched channel segment to its hydraulic radius;

"hydraulic radius" is the cross-sectional area of a channel divided by the length of the perimeter of that cross section, e.g., the hydraulic radius of a circular channel is one-fourth its diameter; and "flow field", refers to a component of an electrochemical cell allowing ingress and egress of fluids such as reactant and waste gasses and liquids to and from reaction zones.

It is an advantage of the present invention to provide a flow field for improved fuel cell performance resulting from improved water and reactant gas distribution.

DETAILED DESCRIPTION OF PREFERRED EMBODIMENTS

Figure 1:
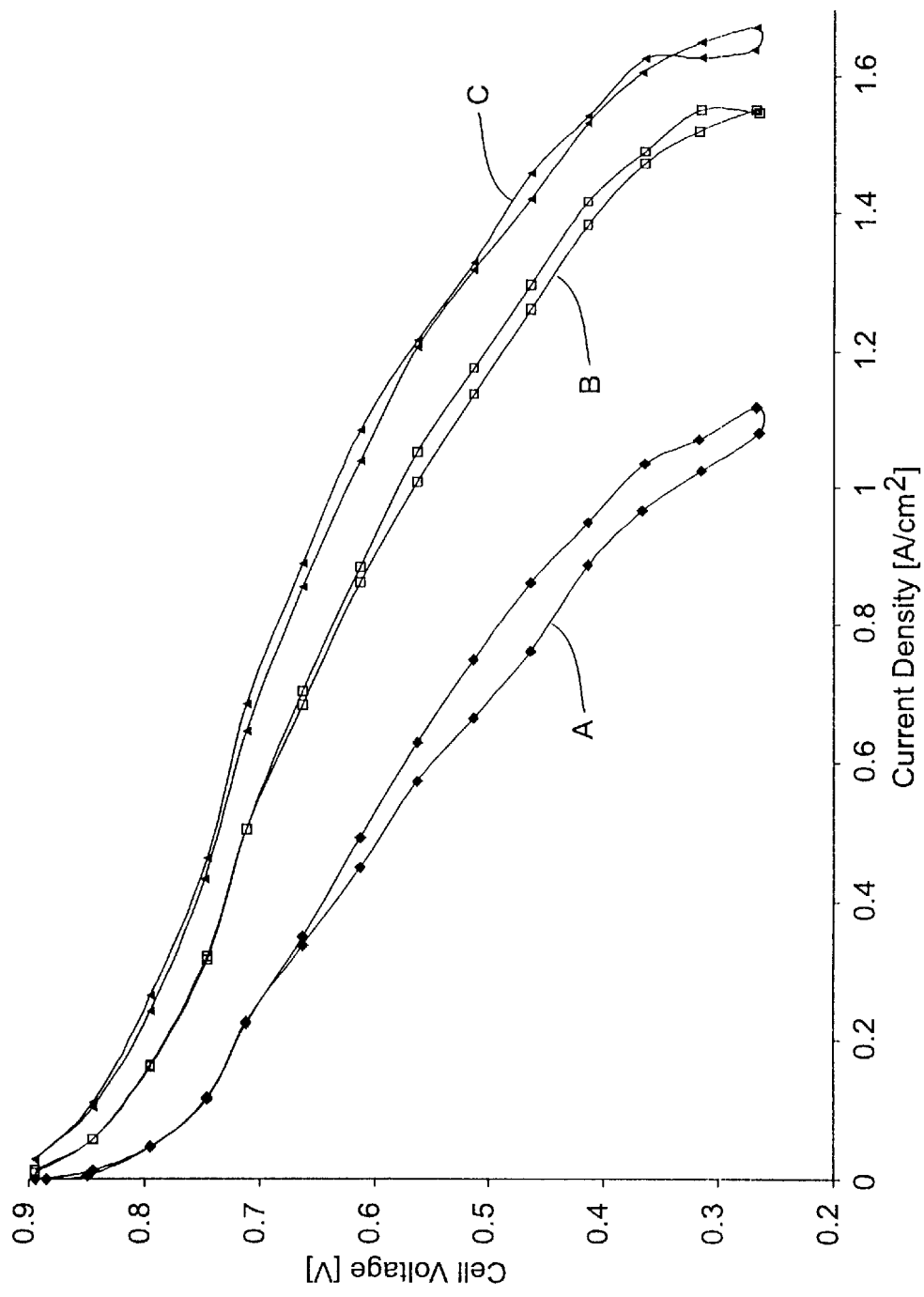
FIG. 1 is a graph of voltage vs. current density representing the polarization curves for three fuel cells according to the present invention.

The present invention provides an improved flow field for an electrochemical cell such as a fuel cell. Fuel cells are electrochemical cells that utilize a fuel and an oxidizing agent to produce an electrical current. The two chemical reactants, i.e., the fuel and the oxidizing agent, separately react at two isolated electrodes containing a catalyst. An ion exchange element is located between the electrodes to prevent direct reaction of the two reactants and to conduct ions. The combination of an ion exchange element and electrodes commonly is referred to as a "membrane electrode assembly," or MEA. In conventional fuel cells, the MEA is disposed between two rigid, electrically-conductive separator plates, each of which has at least one flow passage or groove engraved, milled, or molded in the surface facing the MEA. These separator plates, also referred to as flow field plates, are typically formed of graphite. The flow passages in the separator plates direct the fuel and oxidant to the respective electrodes, namely, the anode on the fuel side and the cathode on the oxidant side. In a stack of cells, the separator plates are electrically coupled in series to provide a path for electrical conduction between the electrodes of adjacent cells.

MEA's are advantageously operated at or near atmospheric pressure. However, lower operating pressures require better designed flow fields to eliminate problems of uneven reactant distribution and water removal in channels with low pressure drops.

The microchannel flow field of the present invention employs reduced-dimension flow field features, added water management surfaces, and highly parallel flow field patterns. The present inventors have discovered that parallel flow channels can be made with substantially smaller dimensions while maintaining a very low pressure drop. The channels have a depth of less than 800 $\mu$m, preferably less than 650 $\mu$m, more preferably less than 250 $\mu$m, and most preferably between 125 and 250 $\mu$m. The channels have a width of less than 800 $\mu$m, preferably less than 650 $\mu$m, more preferably less than 250 $\mu$m, and most preferably between 125 and 250 $\mu$m. For 500 cm$^2$ active area MEAs, parallel channels with widths of between 125–250 $\mu$m will still have a pressure drop of only few tens of kPa if implemented as microchannel flow fields. Larger cells may be divided into sub-sections to maintain low pressure drop.

In a preferred embodiment, these micro-flow channels comprise a highly parallel pattern. These patterns may contain interconnections or branch points. Such patterns include parallel lines, hatching, and grid patterns of channels. The micro-flow channels can be of any cross-sectional geometry that provides desired fluid transport, and preferably one which is readily replicated. Preferably, the channel walls are inclined so that the channel width is greater at the surface than at the channel floor. An inclined-wall geometry allows channels to be packed tightly together and the land area between channels to be reduced theoretically to a limit of zero, e.g., where channels meet only at peaks or ridges.

In a preferred embodiment, these micro-flow channels are closely spaced, having a pitch of less than 800 $\mu$m, preferably less than 650 $\mu$m, more preferably less than 250 $\mu$m, and most preferably between 125 and 250 $\mu$m. As used herein, pitch is the smallest distance between adjacent channels as measured between directly analogous parts, e.g., peak-to-peak or edge-to-edge.

It has also been discovered that adding smaller features (microfeatures) to the base of the channels provides for new mechanisms of water removal and for improved electrical and thermal contact with the diffuser. These micro-features have dimensions in depth and width that are less than 80% of the depth and width of the channels, preferably less than 50%, and more preferably less than 20%. Preferably the microfeatures have dimensions of less than 160 $\mu$m and more preferably less than 100 $\mu$m. It has been discovered that microfeatured flow fields may have channels of up to 3 mm in depth or width and still retain advantages of the present invention.

The flow fields of the present invention may be made by any suitable method, including the methods described in U.S. Pat. No. 5,728,446, to Johnston, et. al., and pending U.S. patent application Ser. No. 09/099,269, both of which are incorporated herein in full by reference. These contemplate a liquid management film comprised of parallel channels with secondary grooves of a substantially finer scale imbedded in the bottom of each channel. It is believed that these secondary channels cause the preferential condensation of water in a very thin film at the bottom of the channel. The intersection of the two surfaces of the microgroove is an active site for the liquid film adsorption from the vapor, and it initiates the development of a continuous liquid film along the length of the microgroove. The liquid is driven by the disjoining pressure gradient of an external pressure potential on the liquid film, which depends on the film thickness gradient and also the capillary pressure gradient. Such a film is then moved by capillary pressure gradients to the end of the channel creating a very efficient conduit for water redistribution. Furthermore, the small channel size encourages liquid droplets to be formed across the channel, allowing efficient removal from the channel. In contrast, larger channels discourage this behavior, requiring momentum transfer through frictional forces between the moving gas stream and the liquid layer. This leads to poor liquid removal efficiency and poor catalyst utilization. The inventors have discovered that by using this approach in the present invention, water can be actively moved through channels of narrow depth or width that have little hydraulic pressure drop thereby maintaining accessibility of reactants to the entire cell active area.

A further advantage of the present invention is better distribution of mechanical support and reduction of "tenting", which is expansion of the DCC material into the flow field. As the span across each flow channel is reduced, the compressive force acting on the DCC is distributed over a more uniform area. As each unsupported area reduces in dimension, the degree of tenting is similarly lessened. A decreased tendency toward tenting is especially important for softer DCC materials.

As the lateral dimensions of the land features are reduced the lateral distance that reactant gases must travel under the land areas to reach all available active catalyst sites is reduced. Furthermore, reduction in the channel dimension reduces the lateral distance that electrons must travel from the active sites to the land areas. The smaller land dimensions can improve gas distribution, or the opportunity can be taken to reduce the overall thickness of the DCC, as the need for lateral gas dispersion through the DCC is reduced. (See Example 5, below.) Since the overall transport rate through the DCC is a function of its thickness, the diffusion rates of both the reactants and product water are improved. This additionally reduces weight, volume, cost, and electronic resistance of the DCC layer.

It is an advantage of the flow field plate of the present invention that it allows the use of a thinner DCC layer. (See Example 5, below.) In part, this is possible because of the small land area dimensions and small pitch achievable according to the present invention. This allows the reduction of DCC thickness while maintaining an optimal ratio of land width to DCC thickness. An effective MEA using the flow field plate of the present invention can be made using DCC layers of less than 50 $\mu$m in thickness or even less than 25 $\mu$m in thickness.

The improved diffusional characteristics may be defined in terms of the diffusional path length, both for conduction of electricity and gasses. Electric current conducted through the DCC must reach a land area of the flow field plate to be conducted into the electrical circuit of the fuel cell. Thus, narrower channel width reduces electrical path length and therefore improves electrical conductance. Analogously, gasses conducted through the DCC must reach a channel of the flow field plate, and thus narrower land areas allow reduced gas transport path length to the channel and therefore better gas transport, although potentially at the expense of higher electrical resistance. Land width and channel width may be optimized for best mass and electric current distribution.

Preferred embodiments of the present invention have a reduced proportion of land area, up to a point where electrical resistance rises to an unacceptable level. Preferably, the flow field of the present invention has a land area which is less than. 50% of the active area of the fuel cell. More preferably, the land area is less than 25% of the active area of the fuel cell, even more preferably less than 20%, even more preferably less than 15%, even more preferably less than 10%, and most preferably less than 5%. Embodiments having smaller proportions of land area may be accomplished according to the present invention using channels with sloping walls. The same would not be possible using larger channels without creating disadvantageous tenting problems.

Thus, preferred embodiments of the present invention can simultaneously achieve improved distribution of mechanical force, electrical conduction and gas distribution.

The channels preferably have a minimum unbranched aspect ratio (length/hydraulic radius) of 5:1, more preferably exceeding approximately 10:1, even more preferably exceeding approximately 100:1, and most preferably at least about 1000:1. At the top end, the unbranched aspect ratio could be indefinitely high but generally would be less than about 1,000,000:1.

The flow field of the present invention is preferably embodied in a flow field plate. The flow field plate is advantageously made of an electrically conductive material such as a metal. Alternately conductive carbon materials may be used. In addition, materials may be used which are plated, sputtered or otherwise coated with conductive layers by wet methods, vacuum methods, or any suitable method.

Alternately, the flow field of the present invention may be cut or otherwise formed into the diffuser-current collector (DCC) layer of an MEA, so that a single layer of material serves as both DCC and flow field.

This invention is useful in constructing electrochemical cells such as fuel cells.

Objects and advantages of this invention are further illustrated by the following examples, but the particular materials and amounts thereof recited in these examples, as well as other conditions and details, should not be construed to unduly limit this invention.

EXAMPLES

Flow Fields and End Plates

In the following examples, flow field inserts were mounted in end plates made of 316 stainless steel. End plates were machined at a very high precision with rectangular cavities to receive the flow field inserts and flow passages to channel reactant gasses to and from the flow field insert. Flow fields themselves were electroformed from the corresponding masters using Ni as a building material according to the method described in U.S. Pat. No. 5,728,446, Example 1, incorporated herein by reference. The flow field configurations used in all of the examples below were parallel and corresponded to pattern 2 of Table 1 of the '446 patent for both anode and cathode. The pattern comprises parallel linear grooves 635 $\mu$m deep, on a 330 $\mu$m pitch, with wall angles for each groove of 5° from vertical. The flow field inserts were cut from larger electroformed sheets into square shape (22.36 mm×22.36 mm), to match to the 5 $cm^2$ active area MEAs used in the examples below.

The comparative examples used a commercially available 5 $cm^2$ active area cell having identical anode and cathode parallel flow fields, milled from graphite endplates (Fuel Cell Technology, Albuquerque, N.M.). The flow fields comprised 13 square bottom grooves measuring 790 $\mu$m wide, 790 $\mu$m deep and 2.10 mm long. Land areas were 790 $\mu$m wide. The flow fields were connected on their open ends by parallel square bottom grooves measuring 1.57 mm wide, 1.57 mm deep and 2.10 mm long.

Catalysts and Membrane Electrode Assemblies (MEA's)

The following Examples demonstrate several different means of incorporating catalyst into a membrane electrode assembly, designated dispersed catalyst, nanostructured catalyst, and gradient catalyst, as described following.

In each of the following Examples, the ion conducting membrane (ICM) used in making MEA's was Nafion™ membranes (DuPont Chemicals, Wilmington, Del., available from ElectroChem, Inc., Woburn, Mass., and Aldrich Chemical Co., Inc., Milwaukee, Wis.), a perfluorinated sulfonic acid-functional polymer. Unless otherwise indicated, the ICM was a Nafion 112 membrane that was uniaxially stretched so as to reduce the thickness of the membrane from 50 micrometers to about 25 micrometers.

In each of the following Examples, the electrode backing layer or diffuser-current collector (DCC) was 0.45 mm or 0.42 mm thick DS (double sided) ELAT™ electrode backing material.

MEA's having dispersed catalyst on both surfaces (D-D) were prepared as follows: ELAT™ electrode backing material (400 micrometer) was coated with an ink comprising 0.67 g Pt/C and 0.7 g glycerin suspended in 6.7 g of a 5 wt % solution of Nafion™ 1000 in isopropyl alcohol/water, then dried in a vacuum oven at 93 ° C. for 10 minutes to form a catalyst layer on the DCC. A 5 $cm^2$ square piece of the catalyzed DCC was positioned on each side of a stretched Nafion™ 112 membrane. The assembly was then centered in a 5 $cm^2$ square hole, cut to match the catalyst area, of a 566 micrometers thick (total) Teflon™ coated fiberglass gaskets (The Furon Co., CHR Division, New Haven, Conn.). A 50 micrometer thick, 7.6 cm×7.6 cm sheet of polyimide was placed on each side. This assembly was placed between two steel shim plates and pressed at 135° C. and 10 MPa using a Carver lab press (Carver Inc., Wabash, Ind.). The polyimide sheets were peeled away leaving the five-layer MEA with dispersed catalyst on both surfaces. The above MEA was mounted in the fuel cell test fixture using 30.5% compression, using the original non-compressed material as reference.

Nanostructured catalyst MEA's were made as follows: Microstructures employed as catalyst supports were made according to the process described in U.S. Pat. No. 5,338,430, incorporated herein by reference. Nanostructured perylene red pigment, i.e., C.I. Pigment Red 149, or N,N'-di(3,5-xylyl)perylene-3,4:9,10-bis(dicarboximide) (PR149, American Hoechst Corp., Somerset, N.J.) films on polyimide substrates were made using the techniques described in U.S. Pat. Nos. 4,812,352 and 5,039,561 by thermal evaporation and vacuum annealing. After deposition and annealing, highly oriented crystal structures were formed with large aspect ratios, controllable lengths of about 0.5 to 2 micrometers, widths of about 0.03–0.05 micrometer and aerial number density of approximately 30 whiskers per square micrometer, oriented substantially normal to the polyimide substrate. These microstructure catalyst supports were coated with a nanoscopic metal catalyst and pressed into an ion conductive membrane (ICM), after which the polyimide substrate was peeled away leaving the nanostructured catalyst supports embedded in the ICM.

MEAs having nanostructured elements on both electrode surfaces were then prepared as follows: A three-layer MEA with 5 $cm^2$ of active area was prepared by a nip-rolling method. Two 5 $cm^2$ square pieces of the nanostructured elements on a microtextured catalyst transfer polyimide substrate (MCTS), prepared as described in copending application Ser. No. 09/369,619, incorporated by reference—one for the anode, one for the cathode—were placed on either side of the center of a 7.6 cm×7.6 cm Nafion™ membrane prepared as indicated above. The anode catalyst was composed of Pt and Ru sputtered on MCTS whiskers at 0.22 $mg/cm^2$. The cathode catalyst was composed of Pt sputtered on MCTS whiskers at 0.28 $mg/cm^2$. A 50 micrometer thick, 7.6 cm×7.6 cm sheet of polyimide and 20 cm×28 cm sheet coated paper (Premium Inkjet Glossy Paper, Item # HP C3836A, Hewlett-Packard Co., Palo Alto, Calif.) was placed on each side of the catalyst coated substrate/Nafion™/catalyst coated substrate sandwich, with the glossy side of the paper toward the catalyst coated substrate. This assembly was nip-rolled between two steel rolls at 135 ° C. and 6.9 MPa at 0.33 m/min. The paper and the original 5 $cm^2$ polyimide substrates were peeled away leaving the catalyst attached to the surface of the Nafion™ membrane. For preparation of a five-layer MEA, the above three-layer ICM was covered with 0.45 mm thick DS (double sided) ELAT™ electrode backing material. Both the DS ELAT™ electrode backing material and 3-layer ICM were sputtered with 200 Å planar equivalent of Pt before attachment. The assembly was centered in a 5 $cm^2$ square hole, cut to match the catalyst area, of a 200 micrometers thick Teflon™ coated fiberglass gasket (The Furon Co., CHR Division, New Haven, Conn.). A 50 micrometer thick, 7.6 cm×7.6 cm sheet of polyimide was placed on each side. This assembly was placed between two steel shim plates and pressed at 135° C. and 10 MPa using a Carver lab press (Carver Inc., Wabash, Ind.). The polyimide sheets were peeled away leaving the five-layer MEA having nanostructured elements on both electrode surfaces. This MEA was mounted in the fuel cell test fixture using 38.5% compression, using the original non-compressed material as reference.

MEA's having nanostructured elements on one electrode surface and both nanostructured and dispersed catalyst on the second surface are designated gradient catalysts (N-G). These MEA's are a 6-layer constructions described in copending U. S. patent application Ser. No. 09/312,514, incorporated herein by reference, which consist of an anode DCC layer, anode catalyst layer, membrane electrolyte, two cathode catalyst layers, and a cathode DCC layer.

Gradient MEA's (N-G) were prepared as follows: Two 5 $cm^2$ square pieces of the nanostructured elements on an MCTS polyimide substrate—one for the anode, one for the cathode—were placed on either side of the center of a 7.6 cm×7.6 cm Nafion™ membrane prepared as indicated above. The anode catalyst was composed of Pt and Ru sputtered on the MCTS whiskers in the amount of 0.22 $mg/cm^2$. The cathode catalyst was composed of Pt sputtered on the MCTS whiskers in the amount of 0.28 $mg/cm^2$. A 50 micrometer thick, 7.6 cm×7.6 cm sheet of polyimide was placed on each side of the catalyst coated substrate/Nafion/catalyst coated substrate sandwich. This assembly was then nip-rolled between two steel rolls at the temperature of 135 ° C. under 6.9 MPa pressure at 0.33 m/min. The original 5 $cm^2$ polyimide substrates were then peeled away leaving the catalyst attached to the surface of the Nafion™ membrane. A layer of dispersed catalyst was then added to the cathode side. DS ELAT™ electrode backing material (420 micrometer) was coated with an ink comprised of 0.67 g Pt/C and 0.7 g glycerin dispersed in 6.7 g of a 5 wt % solution of Nafion™ 1000 E.W. in an isopropyl alcohol/water mixture, then dried in a vacuum oven at 93° C. for 10 minutes to form a catalyst layer on the DCC.

The three-layer catalyzed membrane was covered with 0.42 mm thick catalyzed DS ELAT™ electrode backing material on the cathode side, and non-catalyzed 0.51 mm thick DS ELAT™ on the anode side. The ELAT™ electrode backing material was wetted on the anode (non-catalyzed) side by 0.03 mg of Nafion per $cm^2$ using a 4% Nafion 1100 E.W. solution in glycerin before attachment. The assembly was then centered in a 5 $cm^2$ square hole, cut to match the catalyst area, of a 200 micrometers thick Teflon™ coated fiberglass gasket (The Furon Co., CHR Division, New Haven, Conn.). A 50 micrometer thick, 7.6 cm×7.6 cm sheet of polyimide was placed on each side. This assembly was then placed between two steel shim plates and pressed at 135° C. and 10 MPa using a Carver lab press (Carver Inc., Wabash, Ind.). The polyimide sheets were then peeled away leaving the six-layer MEA with nanostructured elements on one electrode surface and both nanostructured and dispersed catalyst on the second surface.

Thin DCC MEA's

The thin DCC MEA's (tD-Dt) used in Example 5 were made with 23 $\mu$m thick DCC material and dispersed catalyst on both surfaces as follows: ELAT™ electrode backing material (about 0.4 mm thick) was coated with a suspension of 0.67 g Pd/C catalyst and 0.7 g glycerin in 6.7 g of an aqueous isopropyl alcohol solution, then dried at 93° C. in a vacuum oven for 10 minutes to form a catalyst layer on the DCC. The catalyzed ELAT™ electrode backing material on both anode and cathode sides was wetted by 4% Nafion 1100 E.W. in glycerin solution at a concentration of 0.03 mg of Nafion per $cm^2$. A 5 $cm^2$ square piece of the catalyzed and Nafion treated DCC was positioned on each side of a stretched Nafion 112 membrane. The assembly was then centered in a 5 $cm^2$ square hole, cut to match the catalyst area, of a 0.5 mm thick (total) Teflon™ coated fiberglass gaskets (The Furon Co., CHR Division, New Haven, Conn.). A 50 micrometer thick, 7.6 cm×7.6 cm sheet of polyimide was placed on each side. This assembly was then placed between two steel shim plates and pressed at 5 MPa and 105° C. using a Carver lab press (Carver Inc., Wabash, Ind.). The polyimide sheets were peeled away. Then the carbon cloth was also peeled away, leaving behind the inner carbon/Teflon coating of the ELAT as a thin DCC layer. It was found to be necessary to highly compress this layer in order to obtain satisfactory contact between DCC and the microstructured flow field. The above MEA (tD-Dt) was assembled in the test cell with 23 μm gaskets, i.e. gaskets allowing the DCC a thickness of 23 μm.

Test Cell Procedures

The MEA's were tested using a 360 A test station purchased from Fuel Cell Technologies, Inc, Albuquerque, N.M., using either the microstructured flow field end plate described above or the comparative end plate. Each bolt of the test fixtures was torqued to 13.8 N·m. The test station included a variable electronic load with separate anode and cathode gas handling systems to control gas flow, pressure and humidity. The electronic load and gas flows were computer controlled. Humidification of both anode and cathode gas streams was provided by injecting steam into the gas stream. Amount of added steam was measured by measuring water flow into steam apparatus. Fuel cell polarization curves were recorded under the test parameters indicated below.

Example I

Two D-D type MEA's were compared, one using a microstructured flow field end plate according to the present invention and the other using the comparative end plate.

Fuel cell polarization curves were obtained the under the following test parameters: Anode gas: hydrogen, cathode gas: air, electrode area, 5 $cm^2$; cell compression, approximately 30%; cell temperature, 65° C. or 70° C., anode gas pressure 0.1 MPa; anode gas flow rate, 100 standard cc/min; anode humidification equivalent to 2x or 4xsaturation at temperature; cathode gas pressure 0.1 MPa; cathode flow rate, 300 standard cc/min; cathode humidification equivalent to 0.75x, 1x, or 2xsaturation at temperature. Each fuel cell was brought to operating conditions at 65° C. under hydrogen and air flows. Test protocols were initiated after overnight conditioning of the cells. The following variables were measured: anode pressure, anode flow, cathode pressure, cathode flow, and cell temperature.

The maximum (transport limited) currents obtained at 0.3 V and the optimal conditions providing those results are reported in Table I:

TABLE I

| Flow field type | $I_{max}$ | Anode Humidif. | Cathode Humidif. | Cell Temp. |
| --- | --- | --- | --- | --- |
| Microstructured | 1.289 $A/cm^2$ | 4x satur. | 2x satur. | 65° C. |
| Comparative | 0.661 $A/cm^2$ | 4x satur. | 1x satur. | 70° C. |

Lower operating temperatures and higher humidities were observed to lower the maximum current drawn from the cells. Thus the microstructured flow field of the invention was shown to provide superior water management under the conditions of severe excess of liquid water in the cell.

Example II

Three runs were made at different pressures, all using a D-D type MEA and a microstructured flow field end plate according to the present invention.

Experimental conditions: MEA type: D-D, reactants: $H_2$/Air, cell compression: approximately 30%; flow rates: 0.1/0.3 SLM, pressure: 0.1 MPa (Curve A), 0.15 MPa (Curve B), 0.2 MPa (Curve C), cell temp 70° C., anode 4xsaturation, cathode 1xsaturation, microstructured parallel flow field. FIG. 1 shows the polarization curves for these three runs. MEA's employing flow field plates according to the present invention showed good performance at a range of pressures.

Example III

Runs were made at different pressures comparing two D-D type MEA's, one using a microstructured flow field end plate according to the present invention and the other using the comparative end plate.

Experimental conditions: MEA type: D-D, reactants: $H_2$/Air, flow rates: 0.1/0.3 SLM, pressure: 0.1 MPa (FIG. 2), 0.15 MPa (FIG. 3), cell temp 70° C., anode 4xsaturation, cathode 1xsaturation. Cell compression was 30.55 for all runs except curve C of FIG. 2, which was 33.8%.

Figure 2:
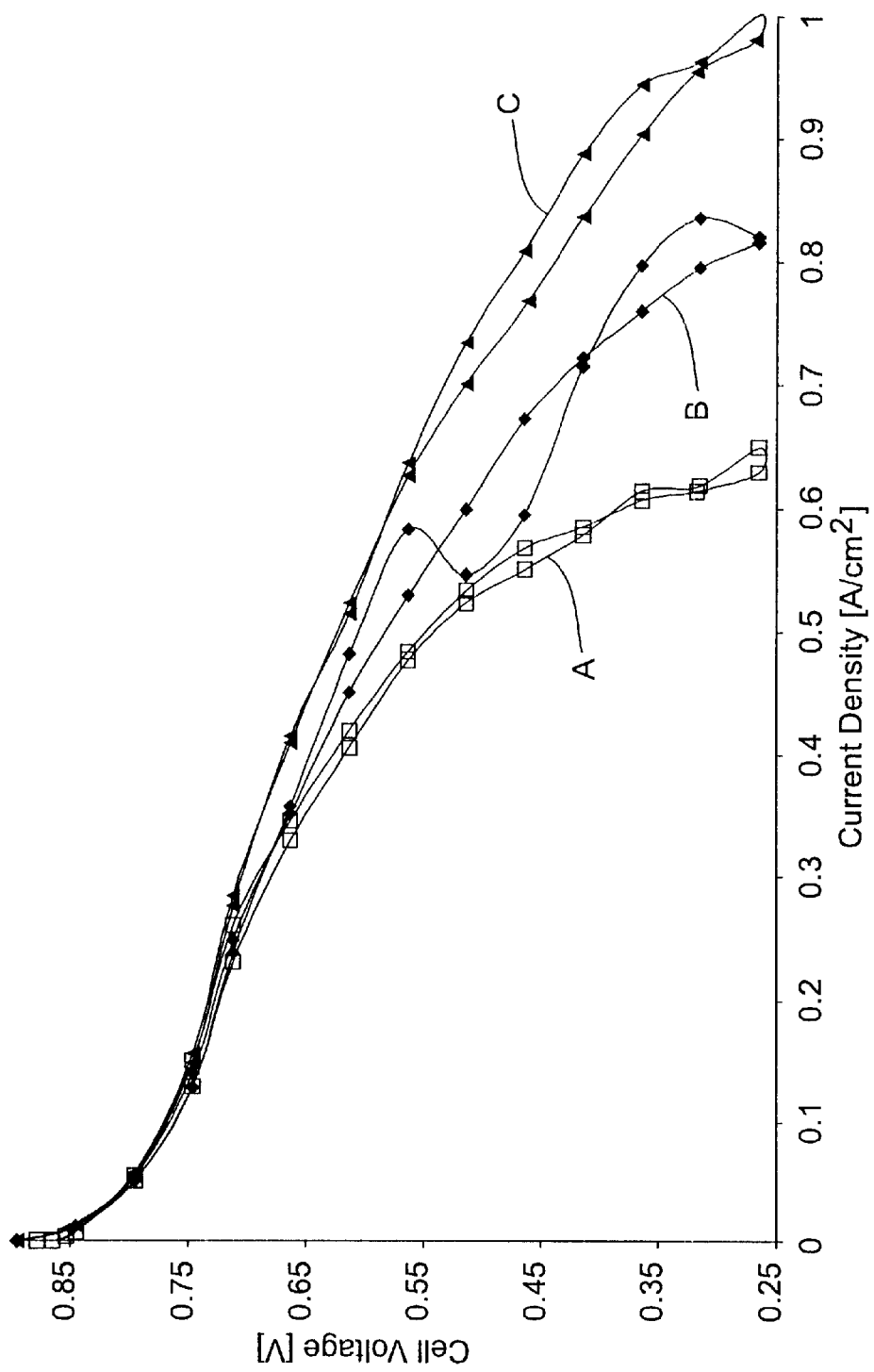
FIG. 2 is a graph of voltage vs. current density representing the polarization curves for two fuel cells according to the present invention and one comparative fuel cell.
Figure 3:
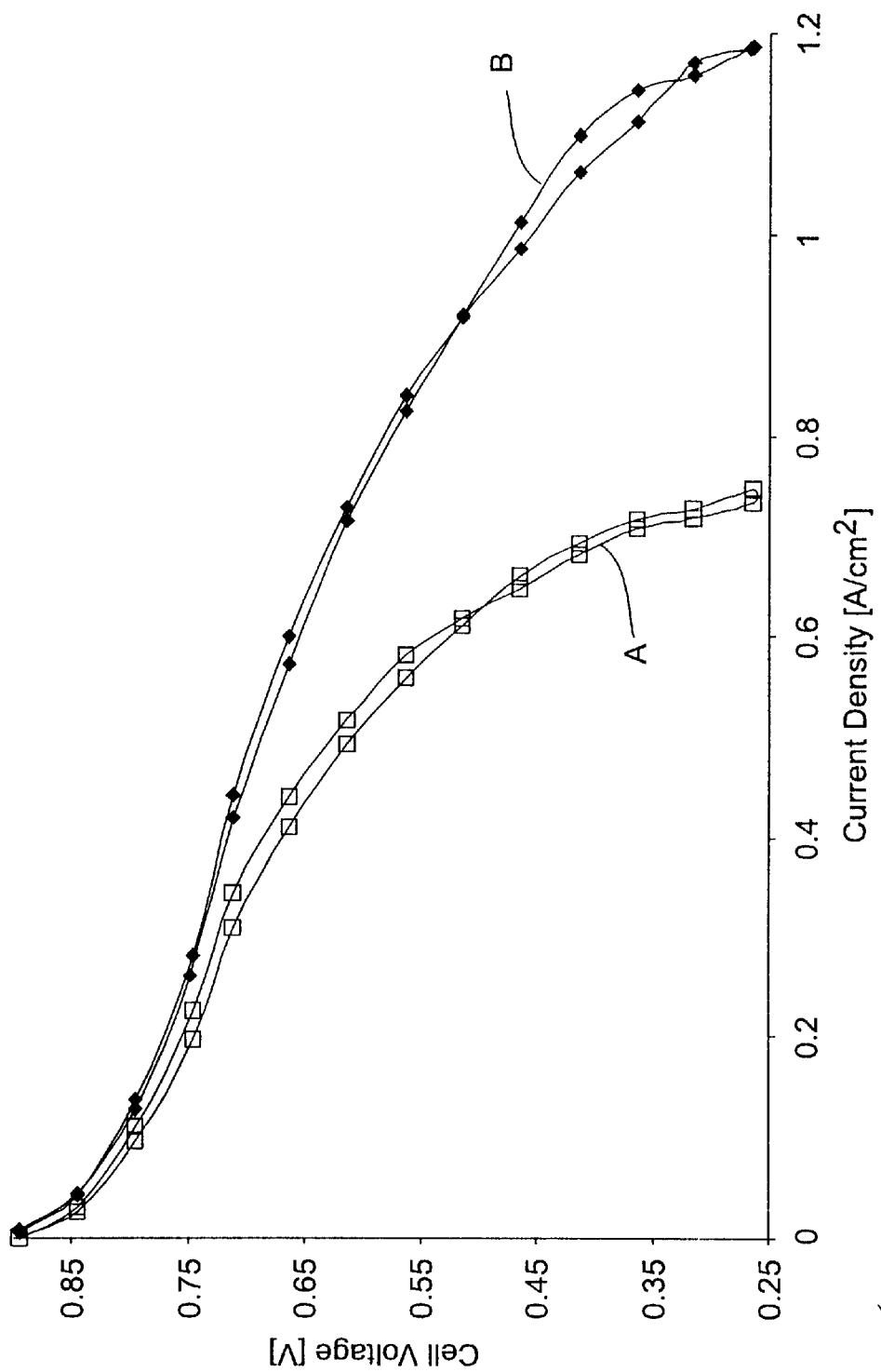
FIG. 3 is a graph of voltage vs. current density representing the polarization curves for one fuel cell according to the present invention and one comparative fuel cell.

FIGS. 2 and 3 demonstrate superior performance of the D-D MEA with a microstructured flow field (Curve B and C) over the same MEA with a standard flow field (Curve A).

In addition, it was observed that the optimum cell compression level used for standard parallel flow field and ELAT-based MEAs was not the optimized one for the use of the same MEA with a microstructured flow field. As a result, it was observed that the increase in cell compression (FIG. 2, Curve C) resulted in further improvements in cell performance.

Thus the microstructured flow field of the invention was shown to provide superior performance to comparative flow field under the conditions of the Example.

Example IV

Runs were made comparing the performance of three types of MEA (D-D, N-N, and N-G) using a microstructured flow field end plate according to the present invention.

Figure 4:
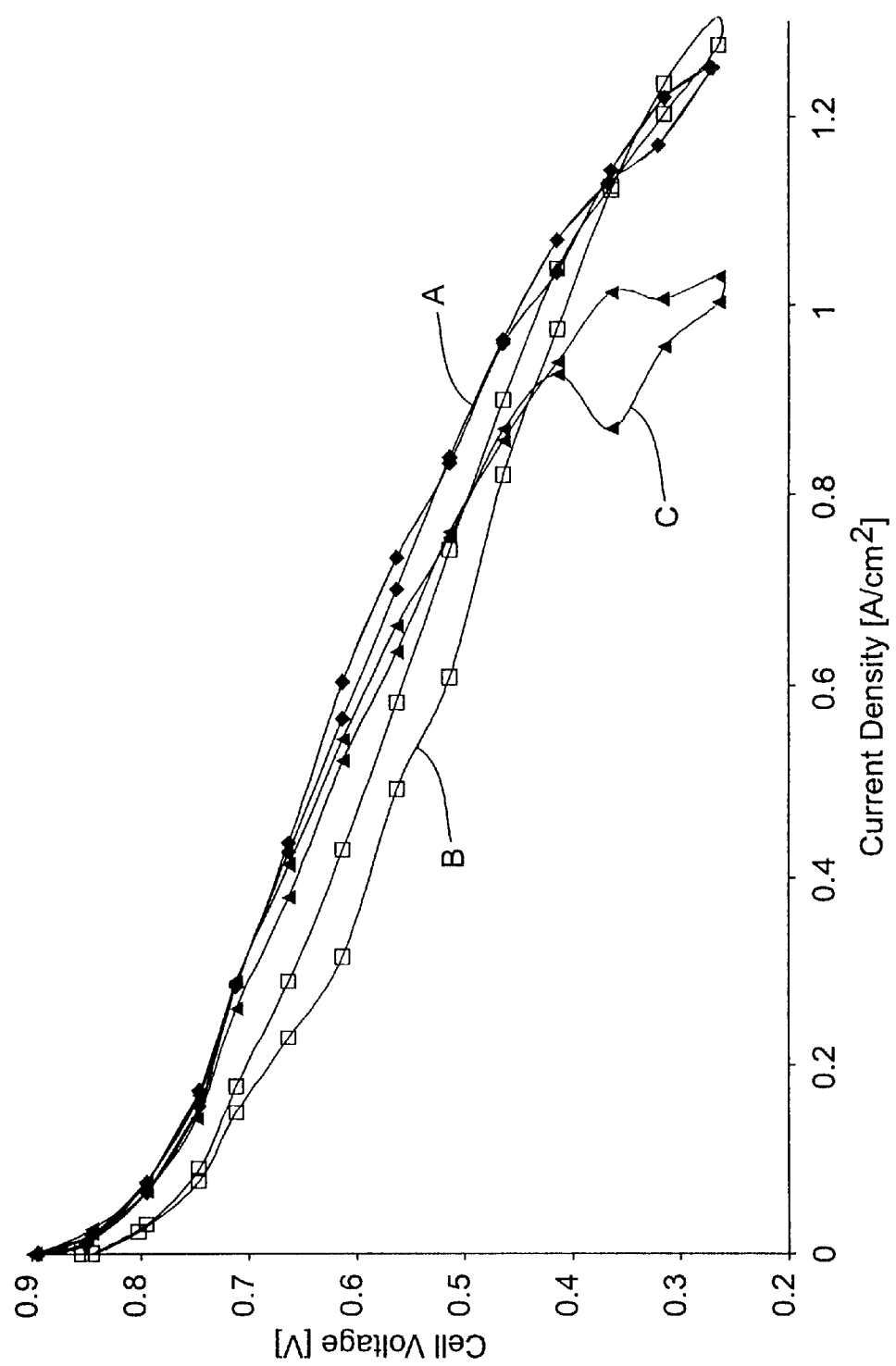
FIG. 4 is a graph of voltage vs. current density representing the polarization curves for three fuel cells according to the present invention.
Figure 5:
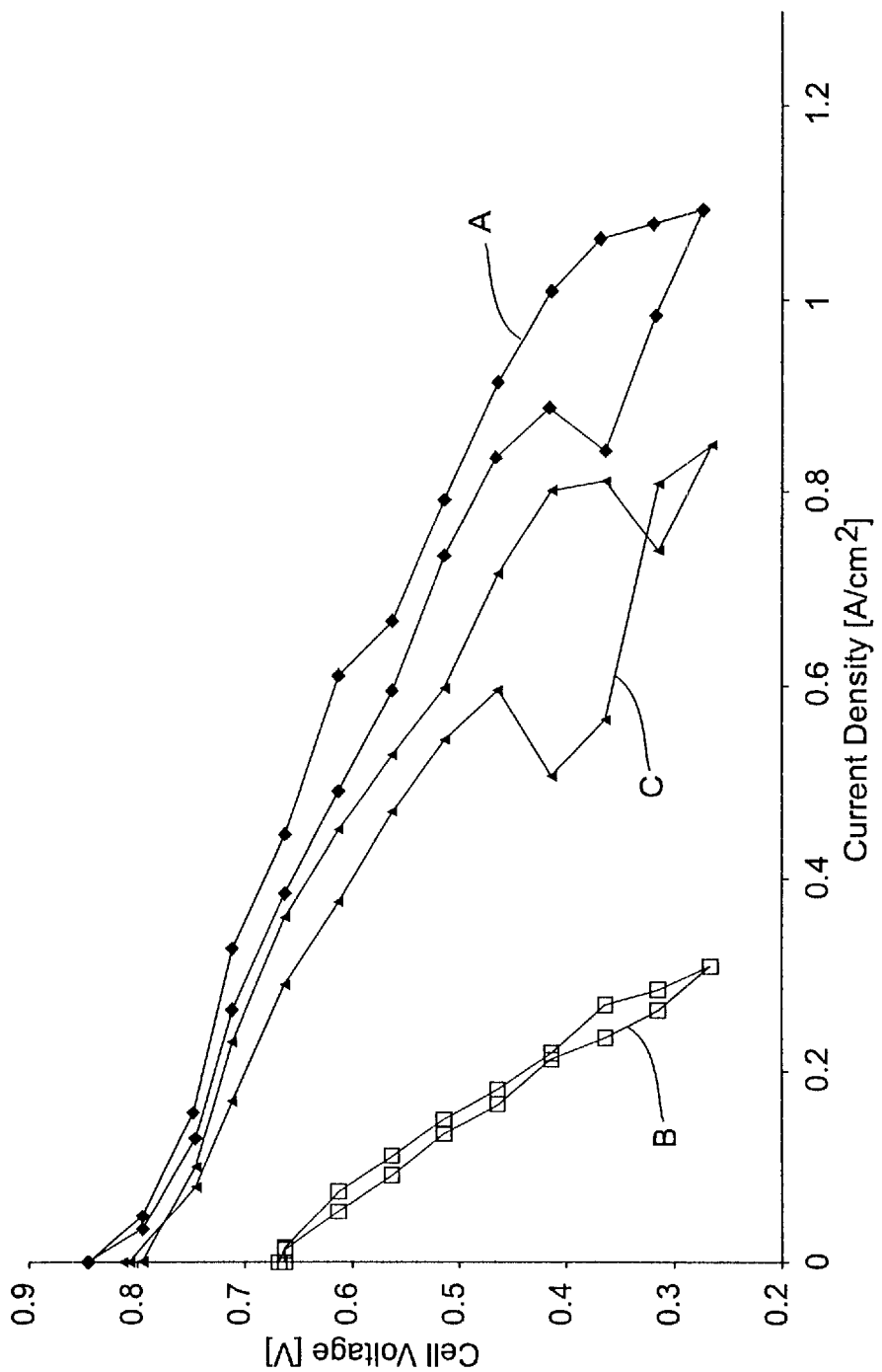
FIG. 5 is a graph of voltage vs. current density representing the polarization curves for two fuel cells according to the present invention and one comparative fuel cell.

FIG. 4 discloses the high level of performance of three different types of MEAs with a microstructured flow field. The MEAs and their respective operating conditions are listed below: D-D (Curve A) operating conditions: cell compression, approximately 30%; $H_2$/Air, 0.1 MPa, 0.1/0.3 SLM, cell temp. 65 C., humidification 4x/1x. N-N (Curve B) operating conditions: $H_2$/Air, 0.1 MPa, 0.1/0.3 SLM, cell temp. 70 C., humidification 2x/0.75x. N-G (Curve C) operating conditions: $H_2$/Air, 0.1 MPa, 0.1/0.3 SLM, cell temp. 70 C., humidification 2x/1x. The operating conditions were chosen so as to obtain the best performance from each MEA at ambient pressure. MEA's employing flow field plates according to the present invention showed good performance with a variety of catalyst types.

Example V

Runs were made with a tD-Dt type MEA having thin DCC layers, using a microstructured flow field end plate according to the present invention then using the comparative end plate, then again using microstructured flow field end plate.

The MEA was first conditioned using the microstructured parallel flow field. The experimental conditions were as follows: cell compression, approximately 30%; MEA type: D-D, 23 μm DCCs, reactants: $H_2$/Air, flow rates: 0.1/0.3 SLM, pressure: 0.1 MPa, cell temp 65° C., anode 2xsaturation, cathode 2xsaturation. At the end of the conditioning period Curve A was recorded. The cell was then opened and flow field plates changed to standard parallel flow field plates. The cell was tested under the same operating conditions and compression level (Curve B). Thereafter, the cell was returned to the microstructured parallel flow field and re-tested to verify that the MEA had not been damaged during flow field swap (Curve C).

Thus the microstructured flow field of the invention was shown to provide superior performance to comparative flow field under the conditions of the Example and to enable the production of thinner MEA's.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A flow field plate for use in an electrochemical cell comprising a flow field comprising a plurality of channels having a pitch of less than 250 $\mu$m.

2. The flow field plate according to claim 1 wherein said channels have a depth of less than 800 $\mu$m and a width of less than 250 $\mu$m.

3. The flow field plate according to claim 1 having an active area comprising a plurality of channels separated by land areas, wherein the land area is less than 25% of the active area of the flow field.

4. The flow field plate according to claim 3 having a thickness of 1 mm or less.

5. A fuel cell comprising a flow field plate according to claim 3.

6. The fuel cell according to claim 5 which include diffuser-current collector layers of less than 25 $\mu$m in thickness.

7. A flow field plate for use in an electrochemical cell comprising a flow field comprising one or more channels having a depth of less than 800 $\mu$m and a width of less than 250 $\mu$m, said flow field plate having a thickness of 1 mm or less.

8. A fuel cell comprising a flow field plate for use in an electrochemical cell comprising a flow field comprising one or more channels having a depth of less than 3 mm and a width of less than 3 mm wherein said channels additionally comprise microfeatures having a depth of less than 80% of the depth of said channels and having a width of less than 80% of the width of said channels.

9. The fuel cell according to claim 8 which includes diffuser-current collector layers of less than 25 $\mu$m in thickness.

10. A diffuser-current collector for use in an electrochemical cell comprising a flow field comprising one or more channels having a depth of less than 3 mm and a width of less than 3 mm wherein said channels additionally comprise microfeatures having a depth of less than 80% of the depth of said channels and having a width of less than 80% of the width of said channels.

* * * * *

UNITED STATES PATENT AND TRADEMARK OFFICE
CERTIFICATE OF CORRECTION

PATENT NO. : 6,555,261 B1  Page 1 of 1
APPLICATION NO. : 09/430568
DATED : April 29, 2003
INVENTOR(S) : Krzysztof A. Lewinski It is certified that error appears in the above-identified patent and that said Letters Patent is hereby corrected as shown below:

Col. 1
Line 6, delete "of" and insert -- to --, therefor.

Col. 5
Line 29, after "than" delete ".".

Col. 10
Line 40, delete "65 C.," and insert -- 65° C., --, therefor.
Line 42, delete "70 C.," and insert -- 70° C., --, therefor.
Line 44, delete "70 C.," and insert -- 70° C., --, therefor.

Col. 12
Line 1, in Claim 6, delete "include" and
        insert -- includes --, therefor.

Signed and Sealed this

Twenty-ninth Day of January, 2008

JON W. DUDAS
*Director of the United States Patent and Trademark Office*